United States Patent [19]

Jahnsen et al.

[11] 3,859,209

[45] Jan. 7, 1975

[54] SYSTEM FOR AND METHOD OF EXTRACT CONCENTRATION AND DIRECT INJECTION INTO A CHROMATOGRAPHIC INSTRUMENT

[75] Inventors: Vilhelm J. Jahnsen, Lake View Terrace; William G. Bloom, Manhattan Beach; Charles F. Campen, Jr., Monrovia, all of Calif.

[73] Assignee: California Institute of Technology, Pasadena, Calif.

[22] Filed: Aug. 14, 1973

[21] Appl. No.: 341,235

[52] U.S. Cl................ 210/26, 73/23.1, 210/31 R, 210/180
[51] Int. Cl......................................... B01d 15/06
[58] Field of Search.......... 23/230 R, 232 C; 55/25, 55/28; 210/25, 26, 31 C, 32, 65, 71, 175, 180, 188, 31 R; 73/23.1

[56] References Cited
UNITED STATES PATENTS

| | | | |
|---|---|---|---|
| 3,053,077 | 9/1962 | Tracht | 55/25 |
| 3,537,297 | 11/1970 | Loyd et al. | 73/23.1 |
| 3,719,084 | 3/1973 | Walker | 73/23.1 |

Primary Examiner—Samih N. Zaharna
Assistant Examiner—Ivars Cintins
Attorney, Agent, or Firm—Lindenberg, Freilich, Wasserman, Rosen & Fernandez

[57] ABSTRACT

A system for separating organic chemical compounds in an extract consisting of a relatively large volume of solvent in which the compounds are dissolved, comprises a heatable column, packed with an appropriate packing material. The extract is injected into the column after the latter's temperature is above the vaporization temperature of the solvent. The solvent coming in contact with the heated packing material vaporizes, and the solvent vapors are flushed out of the column, while the compounds are deposited on the packing material and thereby prevented from exiting the column together with the solvent vapors. After complete removal of all solvent vapors, the temperature of the column is raised to above the vaporization temperature of all of the compounds to vaporize the compounds and thereby separate them from the packing material. An appropriate flushing gas transfers the vaporized compounds from the column for direct injection into an analytical instrument, such as a gas chromatograph.

13 Claims, 4 Drawing Figures

SYSTEM FOR AND METHOD OF EXTRACT CONCENTRATION AND DIRECT INJECTION INTO A CHROMATOGRAPHIC INSTRUMENT

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2456).

BACKGROUND OF THE INVENTION

1. Field of the Invention

The present invention generally relates to chemical compound processing and, more particularly, to a system for, and method of, separating organic chemical compounds from relatively large volumes of solvents in which they are dissolved for subsequent direct injection of the separated compounds into an analytical instrument.

2. Description of the Prior Art

Methods traditionally utilized for determination of the presence and amount of very small quantities (on the order of a few parts per million by weight) of specific organic chemical compounds, hereafter referred to as compounds, in an aqueous sample in the presence of large amounts of numerous other compounds generally involve manual procedures for separation of desired compounds from the parent sample with subsequent manual application of conventional analytical techniques. At the end of the separation procedures, the desired compounds are present in a dissolved state in a solvent or a mixture of solvents which are contained in an appropriate container. The solvent with the compounds is often referred to as an extract. The ratio of solvent to compounds by weight or volume is extremely high. An extract comprising several milliliters (ml) of solvent in which only a few micrograms ($\mu$gm) of compounds are dissolved is quite typical. Some extracts may contain tens of milliliters of solvent in which less than a microgram of compounds are dissolved.

The problems of separating the minute quantities of the compounds from the relatively large volume of solvent, without loss of compounds, and of injecting these minute quantities of compounds into an analytical instrument are well known. For example, if gas chromatographic analysis of the desired compounds is to be performed, which is generally the case, the ratio of solvent volume to compound volume or weight must be reduced greatly, since the conventional gas chromatograph currently in use can accept only very limited amounts, typically 1 to 10 microliters, of solvent which contains the compounds to be analyzed. Furthermore, if quantitative analysis of the compounds is desired, the precise ratio of solvent to compounds must be known.

Typically, the container containing the extract, is placed in a holder over a source of heat and under a stream of gas, such as nitrogen. As a result, the solvent is allowed to evaporate, leaving only the desired compounds in the container. Thereafter, the compounds are redissolved in a very small but precise quantity, on the order of a few hundred microliters, of a suitable solvent. However, even this small quantity of solvent is much larger than can be accepted by a present-day gas chromatograph. Thus, only a small aliquot of the solution is withdrawn by means of a syringe or similar implement for injection into the gas chromatograph.

Any quantitative output reading of the gas chromatograph must be multiplied by the ratio of the volume of solvent in which the compounds were redissolved to the aliquot volume, since the quantity of each compound, actually injected in the gas chromatograph, is only a small portion of the total quantity of the compounds present in the original extract. Assuming that the compounds are redissolved in 100 microliters of solvent and that the aliquot volume is 10 microliters, only 1/10 of each compound is injected in the gas chromatograph, and therefore each quantitative output reading must be multiplied by 10.

The foregoing described procedure which is conventional and well known, is most disadvantageous for several reasons. It involves several time-consuming steps which must be carefully and accurately performed by experienced personnel, but nevertheless subject to human error. Furthermore, even under the best of circumstances, only a small portion of each compound is actually injected into the gas chromatograph. This is most undesirable since the total quantities of some of the compounds in the original sample may be extremely small and, therefore, when only a small portion thereof is injected into the gas chromatograph, these compounds may pass undetected, unless the gas chromatograph sensitivity is very great.

A need therefore exists for a system and method which would simplify the above-described procedure and which would enable the entire quantities of the compounds, present in an extract, to be injected into a present-day gas chromatograph. Generally stated, a need exists for a system and method which simplifies the separation of even minute quantities of compounds from a relatively large volume of solvent, without any compound loss and which enables the separated compounds to be injected directly into an analytical instrument.

OBJECTS AND SUMMARY OF THE INVENTION

It is a primary object of the present invention to provide a novel system for separating organic chemical compounds from a solvent in which they are dissolved for subsequent injection into a gas chromatograph.

Another object of the present invention is to provide a new method of separating organic chemical compounds which are present in a solvent from the solvent, for subsequent direct injection into an analytical instrument.

These and other objects of the invention are achieved by providing a hollow tube, which is packed with packing material, to be described hereafter. The packed tube will be referred to hereafter as the column. The column temperature is controlled by a heat controller. The column temperature is first raised to a temperature above the vaporization temperature of the extract solvent in which the compounds are dissolved but significantly below the vaporization temperature of any of the compounds. The extract, i.e., the solvent containing the compounds is then introduced into the column preferably by suction through one of its ends. As the solvent enters the column, due to the column's temperature which is above the vaporization temperature of the solvent and due to the reduced pressure existing in the column, the latter vaporizes very rapidly. As the solvent vaporizes, the compounds previously dissolved therein are separated therefrom. Since the column's temperature is significantly below the vaporization temperature of any of the compounds, the latter remain in the column in other than a vapor state. The solvent vapors, which are preferably at a high pressure, flow through the packing material and exit the column through the end opposite the end at which the extract was injected, and therefrom are vented through an appropriate vent port which is connected to a vacuum pump.

The packing material is chosen to facilitate the flow of the solvent vapors through it to enable the solvent vapors to exit the column, while at the same time, the packing material attracts the non-vaporized compounds and prevents them from exiting the column together with the solvent vapors. To insure that all traces of the solvent vapors are removed from the column, the latter is flushed with a flushing gas either following the injection of all the extract into the column or simultaneously therewith. Thereafter, the temperature of the column is raised to above the highest vaporization temperature of any of the compounds. As a result, the compounds vaporize and thereby become separated from the packing material. The vaporized compounds are removed from the column by causing a carrier gas to flow through the column and thereby remove the vaporized compounds from the column to an appropriate instrument, such as a gas chromatograph (GC).

The novel features of the invention are set forth with particularity in the appended claims. The invention will best be understood from the following description when read in conjunction with the accompanying drawings.

DETAILED DESCRIPTION OF THE PREFERRED EMBODIMENTS

Figure 1:
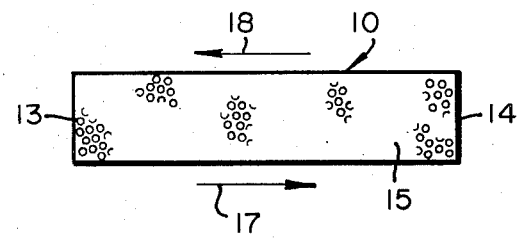
FIG. 1 is a single cross sectional view of a column useful in explaining the principles of the present invention.

The basic principles of the present invention may best be described in connection with FIG. 1, which is a cross-sectional view of an over simplified column 10 in the shape of a hollow tube having opposite ends 13 and 14. The column 10 which is constructed of a material which is capable of being heated to relatively high temperatures, including the highest vaporization temperature of any compounds to be vaporized therein, is packed with a packing material 15 which is selected to perform several basic functions, in the separation of compounds dissolved in a solvent from the solvent, for subsequent direct injection of the compounds into an analytical instrument.

As used herein, the term compounds is intended to refer to one or more organic chemical compounds such as neutral, basic, acidic, or amphoteric drugs though not limited thereto, while the term solvent or liquid solvent is intended to refer to any of the known liquid solvents, or a mixture of any of the known liquid solvents, in which such compounds are dissolved. Some typical solvents, though the invention is not limited thereto, include ethyl-acetate, methylene chloride and methyl alcohol. Such compounds and solvents are well known, particularly by those engaged in the fields of clinical chemistry and forensic studies. For explanatory purposes, it will be helpful to assume that the compounds are dissolved in a single solvent rather than a mixture of solvents, as is usually the case, and that the single solvent is characterized by a known vaporization temperature. Also, it will be helpful to assume that all the compounds vaporize at a known temperature, rather than at different temperatures, as is really the case, and that the vaporization temperature of the solvent is below the vaporization temperature of the compounds. The vaporization temperature of the compounds is intended to refer to the temperature at which the vapor pressure of the compounds is relatively high so that the partition coefficient of the compounds is in favor of their vapor phase.

The novelty of the column 10 may best be highlighted by describing the manner in which it is used. In operation, the column's temperature is first raised to or above the vaporization temperature of the solvent of the extract which is to be introduced into the column and below the vaporization temperature of the compounds. Thereafter, the extract is introduced into the column at one end, e.g., end 13. Due to the column's temperature, the solvent starts to evaporate. One function of the material 15 is to provide a large hot surface area with which the solvent comes in contact to insure the evaporation of all the solvent as it travels toward end 14. Furthermore, the material 15 is chosen to provide a relatively large ratio of void to material volume to enable the solvent vapors to travel and exit through end 14.

The difference between the column temperature and the vaporization temperature of the solvent is chosen to produce relatively high solvent vapor pressure, and thereby increase the rate at which the solvent vapors travel toward end 14. Also, the high vapor pressure of the solvent insures that the partition coefficient of the solvent is in favor of the vapor phase rather than the liquid phase, thereby insuring that none of the solvent in liquid form, which enters the column, adheres to the material 15, either by adsorption, absorption, or by becoming dissolved in or on the surface of the material 15. The actual vaporization temperature of the solvent may be lowered by lowering the ambient pressure in the column by creating a partial vacuum by means of a vacuum pump, as will be described hereafter.

As the extract is introduced into the column and the solvent evaporates, the compounds, previously dissolved in it, become separated from the solvent. Since the column temperature is below the vaporization temperature of the compounds, they remain in other than vapor form. The packing material 15 is selected so that as the compounds become separated from the evaporating solvent, they are effectively trapped by the material 15 and prevented from exiting the column together with the solvent vapors. Such trapping may be achieved by adsorption of the compounds by the material 15 or by becoming dissolved in liquid coatings of the material 15, as will be described hereafter in connection with a specific embodiment which was actually reduced to practice. Thus, while the solvent is vaporized and exits the column, the compounds remain in the column.

To facilitate the evaporation and removal of the solvent vapors from the column, a partial vacuum may be created at end 14 in order to reduce the ambient pressure and suck out all the solvent vapors from the column. Also, such partial vacuum reduces the vaporization temperature of the solvent, thereby reducing the temperature to which the column has to be raised for solvent evaporation. In order to insure the complete removal of all solvent vapors from the column, a flushing gas may be injected into the column through end 13 either following the injection of all the extract into the column or simultaneously therewith. The flushing gas, as it flows through the column, carries out any solvent vapors which may be present in the column.

Once all the solvent vapors have been flushed out of the column, only the compounds of the extract remain therein. The removal of the compounds is achieved by raising the column temperature to about or above the vaporization temperature of the compounds. Consequently, the vapor pressure of the compounds rises and their partition coefficient is in favor of their vapor phase. As a result, the compounds vaporize and thereby become separated from the packing material 15, by which they were previously trapped. A flushing gas is used to flush or carry out the vaporized compounds from the column directly into an appropriate analytical instrument, such as a gas chromatograph (GC).

As will be pointed out hereafter, the gas, used for flushing the vaporized compounds out of the column, may be injected through end 13 so that the compounds are flushed out through end 14 in the direction in which they originally entered the column, as represented by arrow 17. Alternatively, the gas for flushing out the vaporized compounds may be injected through end 14 so that the vaporized compounds exit the column through end 13, as represented by arrow 18. In practice, the flushing gas is of the type which is conventionally used to carry vaporized compounds into a GC. One example of such a flushing gas is helium. Thus, the vaporized compounds, flushed out of the column by the flushing gas, can be injected directly into a GC.

From the foregoing, it should be appreciated that the present invention provides very significant advantages. It enables the total separation of the solvent from the compounds in the original extract without any loss of the compounds. Such separation is produced in the column in which the solvent is vaporized, and its vapors flushed out, while the compounds remain in the column. Once the separation is achieved, it enables the total quantities of all the compounds present in the column to be injected directly into a GC, rather than small fractions of the compounds, as is the case in the prior art.

These advantages are realizable by selecting the packing material 15 so that when the temperature of the column is raised to or above the vaporization temperature of the solvent, as the extract is injected into the column, the packing material provides a large hot surface area to facilitate the speedy evaporation of the solvent, while providing a sufficient void to enable the solvent vapors to exit the column. Also, the packing material is selected to trap the compounds as they become separated from the vaporizing solvent and prevent them from exiting the column together with the solvent vapors. Furthermore, the packing material is selected so that when its temperature is raised to the vaporization temperature of the trapped compounds, the latter become disassociated from the material and vaporize in the column, through which a flushing gas is made to flow to carry the vaporized compounds out of the column and therefrom directly to a GC.

Although, herebefore a single packing material 15 was assumed to be included in the column, the invention is not limited thereto. If desired, as is the case in one embodiment actually reduced to practice which will be described hereafter, two different packing materials, which pack different sections of the column, can be employed. The material, packing the column section near the end through which the extract is injected, may be selected to facilitate the evaporation of the solvent, while the material, packed near the other end of the column, may be selected to trap the compounds which have been separated from the solvent, while at the same time permitting the solvent vapors to pass therethrough.

Figure 2:
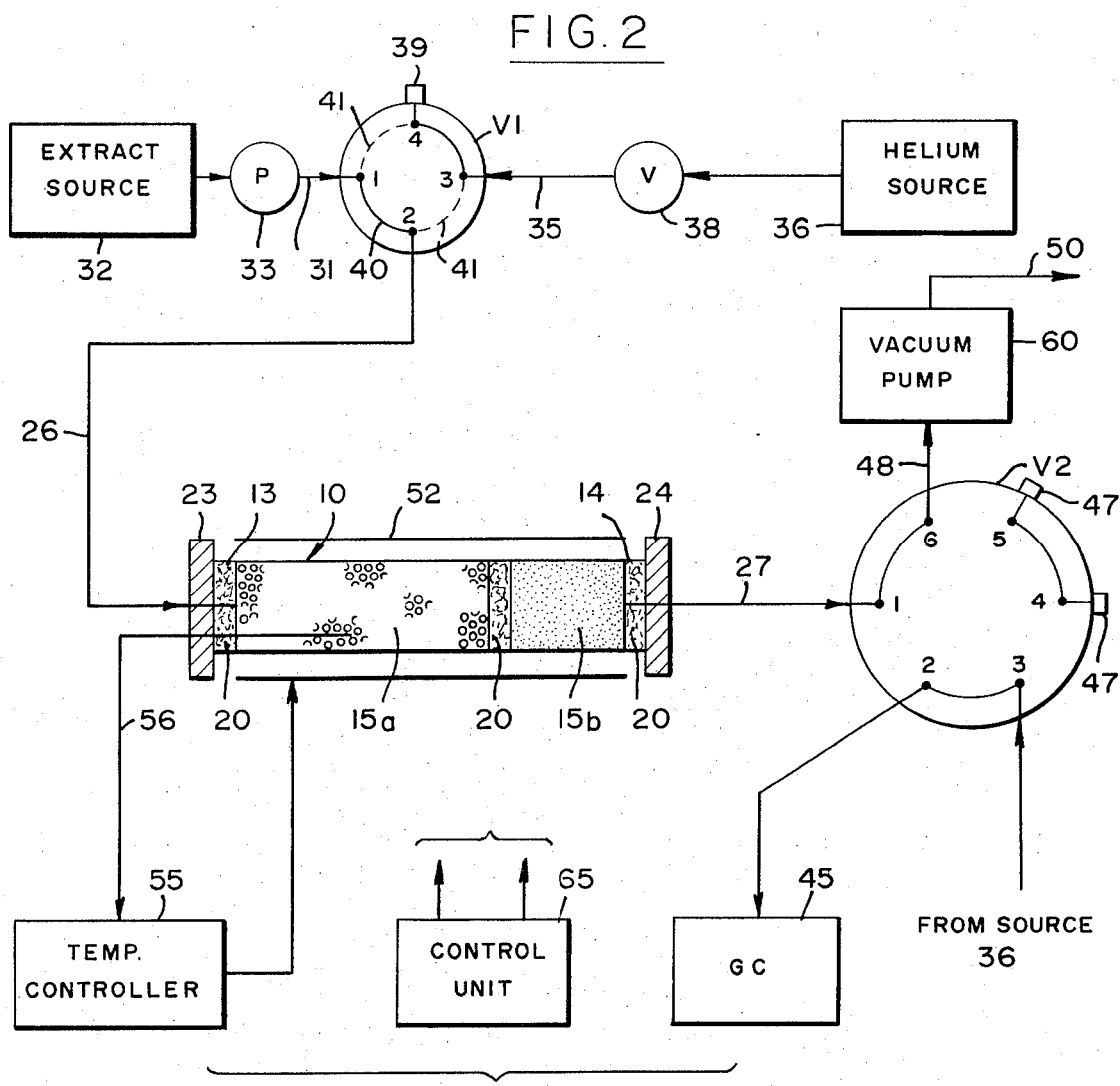
FIGS. 2, 3 and 4 are diagrams of different embodiments of the invention.

An embodiment with a column packed with two different materials is shown in cross-sectional view in FIG. 2, wherein elements similar to those shown in FIG. 1 are designated by like numerals. Therein, the two different packing materials are designated by 15a and 15b. In one embodiment actually reduced to practice, the column 10 is 6 inches long with an outer diameter (O.D.) of 0.25 inch. Packing material 15a consists of silanized glass beads, 30/60 mesh, while material 15b is diatomaceous earth, such as Gas-Chrom Q 80/100 mesh coated by a silicone polymer, such as SE-30, with the ratio of liquid to solid by weight being 3%. Material 15a, which occupies about two-thirds of the column is packed near end 13 through which the extract is to be injected, while material 15b occupies the column section near end 14.

The materials 15a and 15b are separated and held in place in the column 10 by glass wool plugs 20, while the outer ends 13 and 14 of the column are capped by end caps or plugs 23 and 24, respectively. Extending to the interior of column 10 at end 13 is a conduit 26 which terminates at a microvolume valve V1, while a conduit 27, which is in communication with the interior of column 10 at end 14 terminates at a second microvolume valve V2.

Valve V1 is shown to be of the four-port type, the ports being designated, 1–4. Port 1 is connected by means of conduit 31 to a source of extract 32 through a pump 33, while port 2 is connected to conduit 26. Port 3 is connected by means of a conduit 35 to a source 36 of flushing gas, e.g., helium, through a flow controlling device 38. In practice, the helium source is a pressurized cylinder. Reducing valves and gauges are used to control the flow of helium from the source 36. For explanatory purposes, such valves are represented by device 38, which hereafter will be referred to as valve 38. Port 4 is sealed off as represented by plug 39. In the valve position as shown, which is assumed to represent the clockwise (CW) valve position ports 1 and 2, and 3 and 4, are interconnected as indicated by lines 40. In the other valve position, hereafter referred to as the CCW position, ports 1 and 4, and 2 and 3 are interconnected, as indicated by dashed lines 41.

Valve V2 is shown with 6 ports, 1–6. Ports 1, 2 and 3 are respectively connected to conduit 27, a GC column 45 and to helium source 36. Ports 4 and 5 are shown sealed off by plug 47 while port 6 is shown connected to a conduit 48 to an open vent port 50. Valve V2 is assumed to be in the CCW position in which ports 1 and 6, 2 and 3, and 4 and 5, are interconnected as shown by lines 51. In the CW position, ports 1 and 2, 3 and 4, and 5 and 6, are interconnected.

Shown surrounding the column 10 is a heating jacket, such as a heating coil 52, which is connected to a temperature controller 55. Numeral 56 designates a temperature sensor, such as a thermocouple which extends into the column and which is connected to the temperature controller 55. As should be appreciated from the foregoing description, the function of the controller 55 is to heat the column by means of heat jacket 52 to desired temperatures, which are monitored by the thermocouple 56.

In operation, the column 10 is first heated to a temperature above the vaporization temperature of the solvent which is to be vaporized therein. Valves V1 and V2 are in the CW and CCW, as shown. After the column 10 is brought up to the desired temperature, pump 33 is activated to pump extract from source 32 into the column at a preselected rate. As the extract enters the column, it encounters the glass beads 15a, which provide a large heated surface area with which the solvent comes in contact. As a result, the solvent vaporizes quite rapidly. The beads' diameters are chosen to provide an adequate void to bead volume ratio to enable the solvent and particularly its vapors to travel through the glass beads toward end 14 of the column.

The packing material 15b provides a sufficient void to the occupied volume ratio to enable the solvent vapors to pass therethrough to end 14. The solvent vapors exit the column through conduit 27 and therefrom through ports 1 and 6 of valve V2 and conduit 48 is vented out through vent port 50. To facilitate the withdrawl of the solvent vapors from the column 10, a partial vacuum may be produced near vent port 50 by means of a small vacuum pump 60. Such a vacuum tends to suck the solvent vapors out of the column toward vent port 50 as well as to lower the actual vaporization temperature of the solvent.

In practice, all the solvent is completely vaporized by the time the solvent reaches the packing material 15b. Due to the relatively high solvent vapor pressure, the partition coefficient of the solvent is in favor of the vapor phase rather than the liquid phase. Consequently, all the solvent passes through material 15b as vapor with none of it returning to its liquid phase.

As the solvent is vaporized in the column, the compounds previously dissolved therein are separated therefrom. Since their vaporization temperature is substantially below the present temperature of the column, they remain in other than vapor form. The compounds are carried by the solvent vapor stream toward end 14 until they encounter the packing material 15b. In the particular example, in which it is assumed that material 15b consists of SE-30 3% Gas-Chrom Q 80/100 mesh, as the compounds reach material 15b and start passing through its little particles, which as is known, have a large surface to volume ratio, the compounds are attracted by the silicone liquid (SE-30), and in fact become dissolved in it. Thus, while the solvent is evaporated, and its vapors urged to exit the column and escape through vent port 50, none of the compounds is lost since all of them remain dissolved on the liquid coating of material 15b.

After the desired quantity of extract is injected into the column, pump 33 is deactivated, valve V1 is switched to its CCW position, in which ports 2 and 3 are interconnected. Thus, pressurized helium is allowed to flow into the column at a proper rate, controlled by valve 38. The function of the helium at this point is to flush out any remaining solvent vapors in the column. It should be pointed out that during the time the extract and subsequently the flushing helium gas are injected into the column, valve V2 remains in its CCW position (as shown). Consequently, helium continually flows from source 36 through ports 3 and 2 of V2 to the GC 45.

At the end of an appropriate flushing period which is experimentally determinable, valve V2 is switched to its CW position in which ports 1 and 2 are interconnected. Thus, helium flows to the GC through the column rather than directly from source 36. At the same time controller 55 is controlled to raise the temperature of the column 10 to or above the highest vaporization temperature of any of the compounds which at this point in time are dissolved in the silicone liquid of packing material 15b. As the temperature increases, the partition coefficient of the compounds is in favor of their vapor phase. Thus, the compounds vaporize and thereby become separated from the silicone liquid in which they were previously dissolved. Since the compounds were previously dissolved on a large surface area of the particles of material 15b, their total vaporization time is very short. The helium which continues to flow through the column 10 to the GC 45, carries the vaporized compounds out of the column and therefrom directly into the GC.

It should be stressed that with the present invention, all the compounds which are part of the original extract are retained in the column 10 after all the solvent is evaporated. Thus, when the column 10 is heated up and the compounds vaporize, the entire quantities of the compounds are injected into the GC 45, rather than only small portions thereof, as is the case in the prior art. After all the vaporized compounds have been carried to the GC by the helium, valves V1 and V2 are switched to the positions, as shown in FIG. 2 and temperature is lowered to below the vaporization temperatures of the compounds and above the vaporization temperature of the solvent of the next extract. Once this temperature is reached, the column is in condition to receive the next extract.

The above described embodiment was tested and found to produce exceptional results. Extracts containing from 1 ml to 30 ml of solvent, in which minute quantities of compounds from 1 $\mu$gm to 100 $\mu$gm were dissolved, were injected into the column. In some tests, known compounds of known quantities such as those present in commercially available chemical standards were used. Some of the tests were performed with an extract containing a mixture of three solvents such as 50% ethyl-acetate, 45% methylene chloride and 5% methyl alcohol in which the compounds were dissolved. Some of the compounds which were separated from the solvents in the various tests included meprobamate, glutethimide, pentobarbital, phenobarbital and chloropromazine, although it should be appreciated that the invention is not limited to the separation of only these compounds, but rather is applicable to the separation of any compounds from a volume of solvent or solvents in which they are dissolved.

Total solvent evaporation was achieved by raising the column's temperature to about 60°C to 90°C with a partial vacuum of 50 mm of Mercury. Total compound vaporization was achieved by raising the column temperature to about 250°C for the particular compounds which were used. From the various test runs, it was discovered that optimum performance is achieved when the rate of extract injection does not exceed a given limit which depends on the column size. For the particular column, herebefore described, the rate is about 3 ml per minute.

It should be pointed out that the temperatures to which the column has to be raised need not be maintained within precise limits, thus simplifying the task of the temperature controller 55. For solvent vaporization, all that is necessary is to raise the column temperature to or preferably above the highest vaporization temperature of any of the solvent constituents, if the solvent is a mixture of several solvents, at the particular pressure level. Clearly, when a partial vacuum is produced by means of vacuum pump 60, the vaporization temperatures are lower than at atmospheric pressure. Then, for the vaporization of the compounds, the temperature to which the column has to be raised is one which is not less than the highest vaporization temperature of any of the compounds.

The sequence of steps necessary to separate the compounds from the solvent as herebefore described, may be controlled manually, that is, the activation of the various pumps, the valves and the controller 55, may be performed by an operator. It should be apparent, however, that the sequence of steps may be controlled automatically by a control unit 65.

Assuming an initial state of condition in which the valves V1 and V2 are in the CW and CCW positions, respectively, as shown, and that helium flows from source 36 to the GC 45 the steps to be performed may be summarized as follows:

1. Activate controller 55 to raise the column temperature to the solvent vaporization temperature.
2. Activate pump 33 for a selected period to inject the extract into the column and activate vacuum pump 60.
3. Deactivate vacuum pump 60 and pump 33.
4. Switch valve V1 to CCW position, thereby allowing helium to flow to the column.
5. Raise temperature of column to highest vaporization temperature of any of the compounds.
6. Switch valve V2 to CW position.
7. After a preselected period, switch valves V1 and V2 to the CW and CCW positions, respectively.

It should thus be apparent to those familiar with the art that the novel column of the system of the present invention performs functions which are different from those performed by either a GC column or a liquid chromatographic column. In the present invention, column 10 is used to concentrate the extract injected therein. This is achieved by enabling the solvent to be vaporized in the column and enabling the solvent vapors to be flushed out of the column, while the compounds previously dissolved in the solvent remain trapped in the column by its packing material. Once total extract concentration is achieved, the previously trapped compounds are separated from the packing material and are directly injected into a GC by a flushing gas which flows to the GC through the column. Thus, it should be apparent that the present invention is capable of separating minute quantities of compounds from a relatively large volume of solvent, and thereafter directly injecting the separated compounds into a GC.

Herebefore, it was assumed that the helium is injected into the column 10 to flush out the solvent vapors after the entire extract was injected into the column. Also, it was assumed that the vaporized compounds are carried out of the column through end 14 which is opposite the end 13 through which the original extract was injected. Although, such a system operates very satisfactorily, the invention is not limited thereto. If desired, the helium, as the flushing gas of the solvent vapors, may be injected into the column 10 simultaneously with the injection of the extract. Also, if desired, the helium which is used to flush or carry out the vaporized compounds may be introduced into the column through end 14 so that the vaporized compounds would exit the column 10 through the same end 13 through which the original extract was injected. Such an operation could be thought of as back flushing the column.

Figure 3:
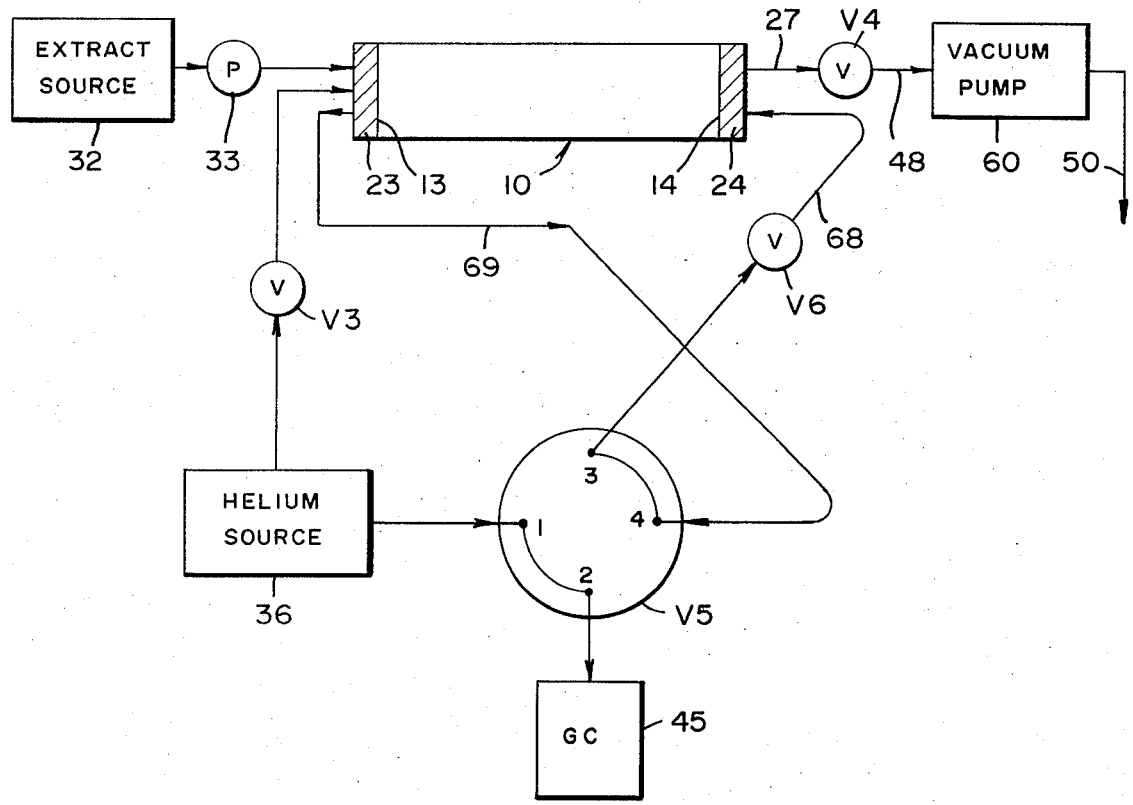

Attention is now directed to FIG. 3, which is a simplified diagram of the system in which it is assumed that the helium flushing gas for flushing out the solvent vapors is injected simultaneously with the extract, while the flushing out of the vaporized compounds is in a direction opposite to the direction in which the extract was injected. To simplify the diagram, the heating jacket 52, the temperature controller 55 and the thermocouple 56 are purposely deleted. As shown in FIG. 3, the extract from source 32 is injected into column 10 through end 13 when pump 33 is activated. Similarly, the helium from source 36 passes through an on-off valve V3 which is in the on position and is injected into the column through the same end 13. Thus, both the extract and the helium flushing gas are injected into the column simultaneously. The vaporized solvent and the flushing gas exit the column through end 14, and through conduit 48, and an on-off valve V4, which is in the on position, are sucked out by pump 60, and vented out through vent port 50.

In FIG. 3, a valve V5 is shown, having four ports, 1–4. In the position as shown, which is assumed to be the clockwise (CW) position, ports 1 and 2 are interconnected as well as ports 3 and 4. The helium source 36 is connected to port 1 while port 2 is connected to the GC 45. Port 3 is shown connected to an on-off valve V6 and a conduit 68 which is in communication with the interior of the column 10 through end 14, while port 4 which is connected to a conduit 69 is in communication with the interior of the column 10 through end 13.

During the vaporization of the solvent and the removal of its vapors by the helium flushing gas, valve V5 is in the position as shown and valve V6 is in the off position. Thus, helium is supplied to the GC 45 from source 36 through ports 1 and 2 of V5. The flow of any gas in conduits 68 and 69 is prevented from taking place since valve V6 is in the off position. After the desired quantity of extract is injected into the column, pump 33 is deactivated. Then after the removal of all the solvent vapors, valves V3 and V4 are switched to their off positions. Then, as the temperature of the column is raised to above the vaporization temperature of all the compounds, valve V5 is switched to its CCW position and valve V6 is switched to its on position. Thus, helium from source 36 flows through ports 1 and 3 of V5 and through valve V6 and conduit 68 into the column through end 14. The helium gas together with any vaporized compounds exit the column through end 13 and therefrom are directly supplied to GC 45 through conduit 69 and ports 4 and 2 of V5.

It is thus seen that in accordance with the present invention, the helium gas for flushing out the solvent vapors may be injected into the column simultanoeusly with the extract. Also, it is seen that the helium for flushing the vaporized compounds may be injected into the column so that the vaporized compounds are flushed out of the column through the same end through which the original extract was injected.

The helium flushing gas, which is used to flush out the vaporized compounds, may be made to flow through the column and therefrom to the GC as the column's temperature is raised to above the vaporization temperature of the compounds. In such an arrangement, the flushing gas carries the vaporized compounds of lower vaporization temperatures to the GC prior to removing the vaporized compounds which are characterized by higher vaporization temperatures. However, if desired, all the vaporized compounds may be introduced into the GC simultaneously. This may be achieved by introducing the helium gas which flushes out the vaporized compounds from the column to the GC into the column only after the column's temperature reaches or is above the vaporization temperature of all the compounds. Consequently, by the time the flushing gas is introduced, all the compounds are vaporized and therefore all of them are flushed out together and injected into the GC.

In the foregoing description, it was always assumed that all the compounds in the extract are separated from the solvent, by vaporizing the latter and trapping the former in the column, for subsequent vaporization and direct injection into the GC. If desired, the present invention may be used to separate compounds of higher vaporization temperatures from compounds of lower vaporization temperatures, contained in the extract, so that only the compounds of the higher vaporization temperatures are subsequently injected into the GC. Such an operation may be thought of as purifying the compounds by removing the compounds with lower vaporization temperatures which are not of interest and preventing them from being injected into the GC.

This may be achieved by raising the temperature of the column 10 before the extract is injected to a temperature above the vaporization temperature of all the compounds which are not of interest, but significantly below the vaporization temperature of any of the desired compounds of higher vaporization temperatures. As a result, when the extract is injected, both the solvent and the compounds of lower vaporization temperature vaporize and are flushed out by the flushing gas, so that only compounds of higher vaporization temperatures remain trapped in the column. Then, after the complete flushing out of the solvent vapors and the vapors of compounds of lower vaporization temperature, the column's temperature is raised to vaporize the compounds trapped in the column and thereby enable the subsequently injected flushing gas to flush out and directly inject such vaporized compounds into the GC.

Similarly, if desired, the invention may be used to inject only the compounds with lower vaporization temperatures into the GC. This may be achieved by first vaporizing all the solvent and thereafter raising the column temperature to above the vaporization temperature of all the compounds of interest but below the vaporization temperatures of the compounds which are not of interest. Thus, only the compounds of interest would vaporize and be carried to the GC by the subsequently injected flushing gas.

Herebefore, it was always assumed that the compounds trapped in the column are removed therefrom by vaporizing them and thereafter injecting a flushing gas which carries them and injects them directly into the GC. Such an arrangement is particularly advantageous for injection of compounds in vapor form into a GC. However, the invention may be used with like success to inject compounds in a liquid chromatograph, rather than to a gas chromatograph.

As is known, a liquid chromatograph is capable of receiving a relatively large volume of liquid as compared with a gas chromatograph. For example, a liquid chromatograph can receive 1 ml of liquid as compared with only a few $\mu$l of liquid which a gas chromatograph can receive without being flooded. In accordance with the present invention, the column can first be used to separate the compounds from a large volume of solvent in the order of tens of mls. Thereafter, a small volume in the order of 1 ml of a flushing liquid can be injected into the column to remove the compounds from the column for direct injection into a liquid chromatograph.

In such an embodiment, the packing material is preferably a solid polymer resin such as polystyrene, which is used to attract the compounds which are separated from the solvent. The separated compounds can then be removed from the resin by injecting a small volume, e.g., 1 ml of a flushing liquid in which the compounds are soluble. One example of such a flushing liquid is chloroform. Thus, as the flushing liquid passes through the packing material, the compounds separate from the resin and dissolve in the flushing liquid. The latter which carries out the dissolved compounds from the column can be injected directly into a liquid chromatograph.

Figure 4:
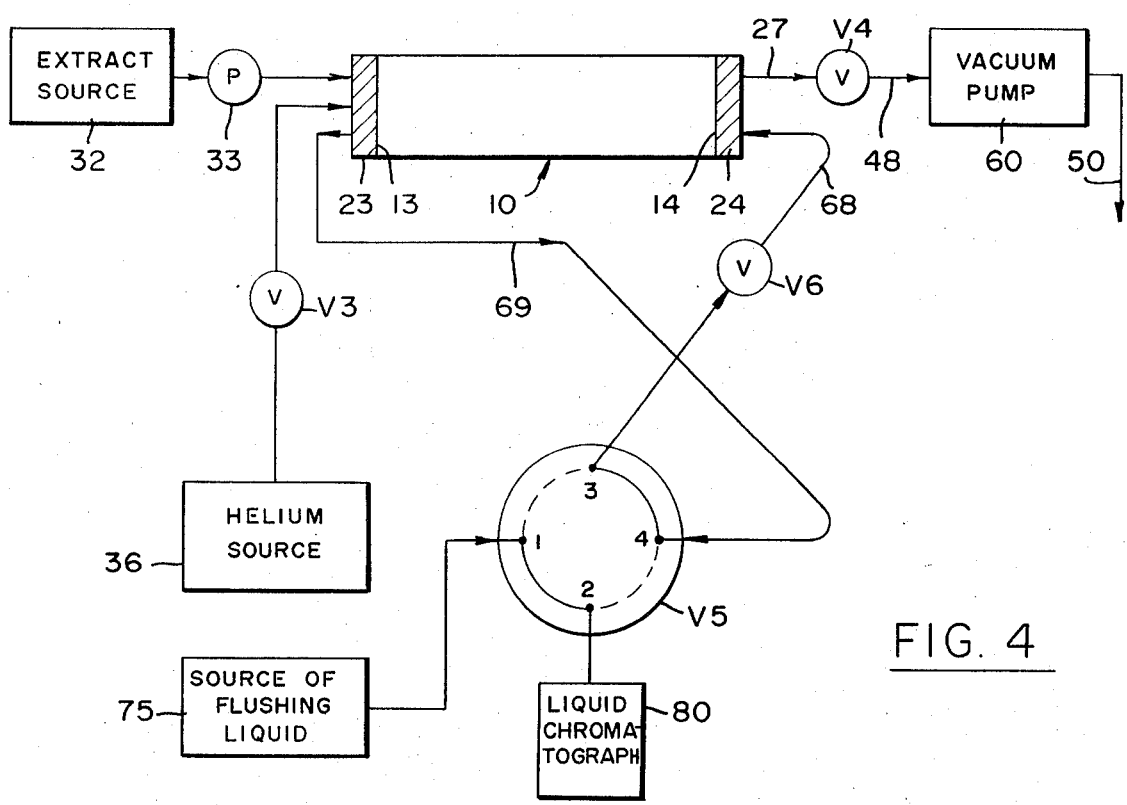

Such an embodiment is shown in FIG. 4, wherein numeral 75 designates a source of flushing liquid. As long a valve V5 is in the CW position, as shown, the liquid from source 75 passes directly to the liquid chromatograph 80. However, when valve V5 is switched to its other position and valve V6 is in the on position, the liquid passes first through the column 10 to remove the compounds therefrom for direct injection into the liquid chromatograph 80.

From the foregoing, it should be appreciated that the present invention is directed to a system for separting compounds contained in a relatively large volume of a liquid solvent. This is achieved by vaporizing the solvent in the novel column, herebefore described, and enabling the solvent vapors to be flushed out of the column while the compounds remain trapped therein by becoming attracted to the packing material in the column. Then, after all the solvent vapors are removed, the trapped compounds are separated from the packing material and are flushed or carried out of the column for direct injection into an analytical instrument.

If the analytical instrument is a GC, the separation of the compounds from the packing material is achieved by vaporizing the compounds in the column and then flushing them out for direct injection into the GC by means of a flushing gas. On the other hand, if the analytical instrument is a liquid chromatograph, the separation of the compounds from the packing material and their flushing out may be achieved by injecting a flushing liquid which separates the compounds from the packing material and carries them directly to the liquid chromatograph (LC).

The novel system of the present invention may also be used for separating compounds from other than a liquid solvent for subsequent direct injection of the compounds into an appropriate analytical instrument. For example, the system can be used in the analysis of airborne contaminants. In such an application, instead of injecting an extract into the column 10, air, containing contaminants, may be sucked through the column by an appropriate vacuum produced by pump 60. As the air passes through column, the contaminants, which are chemical compounds, are attracted by the packing material 15. After a sufficient volume of air passes through the column, the trapped compounds are flushed out to an analytical instrument, e.g., a GC or a LC as herebefore described.

Based on the foregoing description, the present invention may be summarized as comprising a system for, and a method of, separating even minute quantities of compounds from a relatively large volume of matter, e.g., a liquid solvent, in which they are contained, without any loss of compounds, for subsequent direct injection of the total quantities of the separated compounds into an analytical instrument. All the advantages of the invention are realized by the presence of the packed column 10, which effectively performs several important functions. When the compounds are present in a liquid solvent, the column is used to vaporize the solvent while at the same time trapping the compounds by means of its packing material and preventing them from exiting the column together with the solvent vapors, thereby separating the compounds from the solvent. Once separated from the solvent, the column acts as the container of the compounds. The manner of the removal of the compounds from the column to an analytical instrument depends on the analytical instrument.

If the latter is a GC, the compounds are removed from the column by first vaporizing the compounds in the column and thereafter injecting a flushing gas which flushes out the compounds' vapors and carries them directly to the GC. If the analytical instrument is a liquid chromatograph, the removal of the compounds is achieved by passing an appropriate carrier liquid through the column. The carrier liquid separates the compounds from the column's packing material and carries them out of the column for direct injection into a liquid chromatograph.

If the compounds are present in matter which is in a gas state, rather than a liquid state, such as contaminants in air, the column is first used to separate the compounds from the air. This is achieved by passing the contaminated air through the column, in which the compounds are trapped as the air passes therethrough. Once the compounds are trapped, they are removed from the column, as herebefore described.

It should be stressed that if the original extract injected into the column is known to contain a single compound to be identified, after the latter is separated from the solvent in the column, it can be injected directly into a mass spectrometer, or in vaporized form into the vapor cell of an IR spectrometer. It should further be stressed that the system can be used to separate desired compounds in the solvent from other compounds which are not of interest, and thereafter directly inject only the desired compounds into the analytical instrument.

Although particular embodiments of the invention have been described and illustrated herein, it is recognized that modifications and variations may readily occur to those skilled in the art and consequently it is intended that the appended claims be interpreted to cover such modifications and equivalents. In the appended claims, the term "liquid solvent means" unless otherwise stated, is intended to define a single liquid solvent or a mixture of several liquid solvents and the "vaporization temperature of the liquid solvent means" is intended to define the vaporization temperature of the single liquid solvent or the highest vaporization temperature of any of the solvent constituents of the mixture. Also, the term "packing means" is intended to define one or more different types of packing materials.

What is claimed is:

1. A method of handling an extract comprising liquid solvent means in which organic chemical compounds are dissolved to separate the compounds from the liquid solvent means which vaporizes at a temperature which is below the vaporization temperature of any of said compounds, the steps comprising:

providing a structure having first and second ends and packed with packing means between said ends, the packing means characterized by the property of being capable of attracting said compounds and being heatable to a first temperature at which said liquid solvent means vaporizes and below the vaporization temperature of any of said compounds and which is further heatable to a second temperature at which all of said compounds vaporize;

heating said packing means to said first temperature;

injecting said extract into said structure through one end thereof, whereby the liquid solvent means of said extract vaporizes and passes as vapors through said packing means and exits said structure through the other end thereof, with said packing means attracting the compounds which are separated from the solvent means as the latter vaporizes to prevent said compounds from exiting said structure together with said solvent means' vapors;

heating said packing means to said second temperature, whereby the compounds attracted to said packing means vaporize and thereby become separated therefrom;

providing a source of a flushing gas;

injecting said flushing gas from said source into said structure at least after said packing means is heated to said second temperature to flush out the vaporized compounds therefrom;

providing a gas chromatographic column; and selectively directly supplying said flushing gas from said source to said column so as to pass therethrough except when said flushing gas is injected into said structure after said packing material is heated to said second temperature when said column is connected to said source through said structure, so that the flushing gas with the vaporized compounds pass from said structure directly to said column.

2. The method as described in claim 1 further including the step of injecting the flushing gas from said source into said structure prior to heating the latter to said second temperature in order to flush out substantially all the vapors of said liquid solvent means from said structure.

3. The method as described in claim 1 wherein the flushing gas from said source is injected into said structure simultaneously with said extract so as to flush out the vapors of said liquid solvent means from said structure.

4. The method as described in claim 1 wherein the vaporized compounds are flushed out directly to said column by the flushing gas through the end opposite the end through which the extract was injected.

5. The method as described in claim 1 wherein the vaporized compounds are flushed out from said structure directly to said column by the flushing gas through the same end through which the original extract was injected into said structure.

6. The method as described in claim 1 wherein said packing means include liquid coated packing particles through which said vapors of said liquid solvent means pass to exit said structure, while all the compounds are attracted by said particles and become dissolved in the liquid coating thereof, as long as the temperature of said particles is below the vaporization temperature of any of said compounds.

7. The method as described in claim 1 wherein said packing means include a first packing material filling a portion of said structure near the end through which said extract is injected for providing a relatively large surface area with which said liquid solvent means comes in contact as said extract is injected into said structure to facilitate the vaporization of said liquid solvent means when said first material is heated to said first temperature, said packing means including a second packing material filling a portion of said structure near the other end of said structure, said second packing material providing a sufficient void for the vapors of said liquid solvent means to pass therethrough while attracting all of said compounds when the temperature of said second packing material is below the vaporization temperature of any of said compounds.

8. The method as described in claim 1 wherein said liquid solvent means comprises a mixture of several liquid solvents in which said compounds are dissolved and said first temperature is not less than the highest vaporization temperature of any of said several liquid solvents at the particular pressure in said column.

9. The method as described in claim 8 further including the step of injecting the flushing gas from said source into said structure prior to heating the latter to said second temperature in order to flush out substantially all the vapors of said liquid solvent means from said structure.

10. The method as described in claim 9 wherein said packing means include a first packing material filling a portion of said structure near the end through which said extract is injected for providing a relatively large surface area with which said liquid solvent means come in contact as said extract is injected into said structure to facilitate the vaporization of said liquid solvent means when said first material is heated to said first temperature, said packing means including a second packing material filling a portion of said structure near the other end of said structure, said second packing material providing a sufficient void for the vapors of said liquid solvent means to pass therethrough while attracting all of said compounds when the temperature of said second packing material is below the vaporization temperature of any of said compounds.

11. The method as described in claim 10 wherein said second packing material include liquid coated packing particles through which said vapors of said liquid solvent means pass to exit said structure, while all the compounds are attracted by said particles and become dissolved in the liquid coating thereof, as long as the temperature of said particles is below the vaporization temperature of any of said compounds.

12. A system for handling an extract comprising liquid solvent means in which organic chemical compounds are dissolved to separate said compounds from said solvent means comprising:

heatable structure including packing means;

heating means for selectively heating said packing means to a first temperature at which said solvent means is vaporizable, and to a second temperature, above said first temperature, at which said compounds vaporize;

input means including a source of extract and coupled to said structure for injecting said extract into said structure at a selected rate when said structure is heated to said first temperature, whereby said solvent means when coming in contact with said packing means vaporizes, thereby separating the compounds therefrom;

vent means selectively coupled to said structure for enabling the vapors of said solvent means to exit said structure, said packing means being characterized by the property of attracting the compounds separated from said solvent means when the temperature of said packing means is below the vaporization temperature of any of said compounds, whereby when said vaporized solvent means exits said structure, the compounds are attracted to said packing means and remain in said structure, said compounds becoming separated from said packing means and vaporize when the temperature of said packing means is raised to said second temperature;

a gas chromatographic column;

a source of flushing gas;

first means for selectively coupling said structure to said vent means before said packing means is raised to said second temperature, and for decoupling said vent means from said structure when said packing means is raised to said second temperature; and second means including switch means for directly supplying said flushing gas to said column from said source before raising said packing means to said second temperature and for supplying said flushing gas from said source to said column through said structure, when said packing material is at at least said second temperature, whereby as said flushing gas passes through said structure it directly flushes out said vaporized compounds into said column.

13. The system as described in claim 12 wherein said second means include means for directly supplying said flushing gas from said source to said structure from at least after said extract is injected into said structure, whereby said flushing gas flushes out the solvent means from said structure to said vent means when the packing means is below said second temperature and flushes out the vaporized compounds directly to said column after said vent is decoupled by said first means from said structure.

* * * * *